(12) United States Patent
Li et al.

(10) Patent No.: US 11,747,014 B2
(45) Date of Patent: Sep. 5, 2023

(54) ATMOSPHERE-ADJUSTABLE MULTI-STAGED SWIRL AMMONIA BURNER

(71) Applicant: TSINGHUA UNIVERSITY, Beijing (CN)

(72) Inventors: Shui-Qing Li, Beijing (CN); Min-Hang Song, Beijing (CN); Jin-Guo Sun, Beijing (CN); Qian Huang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 87 days.

(21) Appl. No.: 17/580,504

(22) Filed: Jan. 20, 2022

(65) Prior Publication Data

US 2023/0047390 A1 Feb. 16, 2023

(30) Foreign Application Priority Data

Aug. 12, 2021 (CN) .......................... 202110923877.8

(51) Int. Cl.
| | |
|---|---|
| *F23D 14/26* | (2006.01) |
| *F23C 1/00* | (2006.01) |
| *F23C 6/04* | (2006.01) |
| *F23D 14/24* | (2006.01) |
| *F23D 14/58* | (2006.01) |
| *F23L 9/02* | (2006.01) |

(52) U.S. Cl.
CPC ................ *F23D 14/26* (2013.01); *F23C 1/00* (2013.01); *F23C 6/045* (2013.01); *F23D 14/24* (2013.01); *F23D 14/58* (2013.01); *F23L 9/02* (2013.01)

(58) Field of Classification Search
CPC .......... F23D 14/26; F23D 14/24; F23D 14/58; F23C 1/00; F23C 6/045; F23L 9/02
USPC ..................... 431/284, 186–186, 5
See application file for complete search history.

(56) References Cited

U.S. PATENT DOCUMENTS

| | | | | |
|---|---|---|---|---|
| 1,740,985 | A * | 12/1929 | Irish .......................... | F23D 1/00 431/185 |
| 4,374,637 | A * | 2/1983 | Zwick ..................... | F23C 7/004 431/352 |
| 4,988,287 | A * | 1/1991 | Stegelman .............. | F23D 14/66 431/351 |

(Continued)

*Primary Examiner* — Vivek K Shirsat

(57) ABSTRACT

The present application provides an atmosphere-adjustable multi-staged swirl ammonia burner, including a combustion structure, a tangential inflow structure, a secondary-air structure, and an ammonia adjustment structure. The combustion structure includes a swirl-flow pre-combustion chamber, a combustion housing, and a staged-flow adjustment assembly. The staged-flow adjustment assembly is configured to introduce staged airflows into the combustion chamber. The tangential inflow structure is configured to introduce air and fuel gas into the swirl-flow pre-combustion chamber. The secondary-air structure is disposed between the combustion housing and the tangential inflow structure. The ammonia adjustment structure extends through the tangential inflow structure to the combustion chamber and includes a branched inlet pipe and a central adjustment assembly. The branched inlet pipe is configured to introduce ammonia gas. The central adjustment assembly is configured to adjust a spray shape of the ammonia gas introduced from the branched inlet pipe.

14 Claims, 8 Drawing Sheets

(56) References Cited

U.S. PATENT DOCUMENTS

2017/0356656 A1* 12/2017 Ogata .................... F23D 17/00

* cited by examiner

ATMOSPHERE-ADJUSTABLE MULTI-STAGED SWIRL AMMONIA BURNER

CROSS-REFERENCE TO RELATED APPLICATION

The present application claims priority of China Patent Application No. 202110923877.8, filed on Aug. 12, 2021, the content of which is hereby incorporated by reference in its entirety.

TECHNICAL FIELD

The present application relates to the technical field of combustion equipment, in particular to an atmosphere-adjustable multi-staged swirl ammonia burner.

BACKGROUND

To cope with the global climate change, structural adjustment and energy transition towards "carbon neutrality" will be the main trend in the energy industries in China and the rest of the world in the future, and the most fundamental technological approach is to gradually replace fossil fuels with "zero-carbon fuels". At present, it is widely believed that ammonia ($NH_3$) can be a promising candidate for the future "zero-carbon fuel". Compared with traditional fossil fuels, ammonia has outstanding advantages, including higher hydrogen content indicating higher energy density, easy liquefaction storage, low costs for storage and transportation, and mature technology in production and utilization.

However, using ammonia as a fuel still faces the following technical challenges presently: First, the ignition temperature of ammonia/air mixture is relatively high, the flammability range for ammonia/air mixture is narrow, and the maximum laminar burning velocity of an ammonia/air flame is about 20% of that for typical hydrocarbon fuels, indicating that ammonia has low flammability and poor combustion stability. Second, ammonia contains nitrogen, and the production of atmospheric pollutant $NO_x$ in ammonia combustion and utilization is high. In other words, the ignition difficulty, poor combustion stability, and high $NO_x$ emission in ammonia combustion hinder the utilization of ammonia as a fuel.

SUMMARY

In view of this, there is a need to provide an atmosphere-adjustable multi-staged swirl ammonia burner.

An atmosphere-adjustable multi-staged swirl ammonia burner includes a combustion structure, a tangential inflow structure, a secondary-air structure, and an ammonia adjustment structure.

The combustion structure includes a swirl-flow pre-combustion chamber, a combustion housing, and a staged-flow adjustment assembly which are sequentially arranged. The combustion housing defines a combustion chamber. The swirl-flow pre-combustion chamber is in fluid communication with the combustion chamber. The staged-flow adjustment assembly is disposed on a side wall of the combustion housing and away from the swirl-flow pre-combustion chamber. The staged-flow adjustment assembly is in fluid communication with the combustion chamber and configured to introduce staged airflows into the combustion chamber.

The tangential inflow structure is disposed on top of the swirl-flow pre-combustion chamber, fluid communicated with the swirl-flow pre-combustion chamber, and configured to introduce air and fuel gas into the swirl-flow pre-combustion chamber.

The secondary-air structure is disposed between the combustion housing and the tangential inflow structure. The secondary-air structure and the tangential inflow structure surround the swirl-flow pre-combustion chamber. The secondary-air structure is in fluid communication with the combustion chamber and configured to introduce secondary air into the combustion chamber.

The ammonia adjustment structure extends through the tangential inflow structure to the combustion chamber. The ammonia adjustment structure includes a branched inlet pipe and a central adjustment assembly. One end of the central adjustment assembly extends through the tangential inflow structure to the combustion structure. One end of the branched inlet pipe is in fluid communication with the central adjustment assembly and the combustion chamber. The branched inlet pipe is configured to introduce ammonia gas. The central adjustment assembly is configured to adjust spray shape of the ammonia gas introduced from the branched inlet pipe.

In an embodiment, the central adjustment assembly includes a central pipe and an adjustment pipe. The central pipe is a hollow member, and one end of the central pipe passes through the tangential inflow structure and is in fluid communication with the combustion chamber. The adjustment pipe defines a flow-adjustment hole extending along the axial direction of the adjustment pipe. The branched inlet pipe is connected to the central pipe and is in fluid communication with the central pipe through the adjustment pipe. The adjustment pipe is movably arranged in the central pipe and is configured to adjust fluid communication area between the flow-adjustment hole and the branched inlet pipe.

In an embodiment, the projection of the flow-adjustment hole in the axial direction of the adjustment pipe is rectangular. The axial dimension of the flow-adjustment hole is greater than the diameter of the branched inlet pipe.

In an embodiment, the central adjustment assembly includes an ejecting head which is a hollow member, and the ejecting head is mounted to an end of the central pipe located in the combustion chamber. The ejecting head defines a plurality of ejecting holes, and the plurality of ejecting holes are distributed in rows spaced from each other. The lowermost ejecting hole is located at the bottom of the ejecting head and coincides with an axis of the central pipe. The ejecting holes are configured to inject ammonia gas into the combustion chamber.

In an embodiment, the extending angle between an extending direction of each ejecting hole and a horizontal direction is greater than or equal to 0° and less than or equal to 90°. Along the axial direction of the central pipe from bottom to top, the extending angle of the ejecting holes gradually decreases from 90° to 0°.

In an embodiment, the number of rows of the ejecting holes is five. The extending angle between the extending directions of the ejecting holes of the first row and the horizontal direction is 0° to 5°; the extending angle between the extending directions of the ejecting holes of the second row and the horizontal direction is 25° to 35°; the extending angle between the extending directions of the ejecting holes of the third row and the horizontal direction is 55° to 65°; the extending angle between the extending directions of the ejecting holes of the fourth row and the horizontal direction is 70° to 80°; the ejecting hole of the fifth row is arranged at the bottom of the ejecting head and extends along a vertical direction.

In an embodiment, the secondary-air structure includes two coaxially arranged secondary-air pipes defining a secondary-air channel therebetween and a plurality of axial vanes disposed in the secondary-air channel. The coaxially arranged secondary-air pipes are connected between the combustion housing and the tangential inflow structure.

In an embodiment, the coaxially arranged secondary-air pipes include a first pipe and a second pipe. The first pipe is sleeved outside the second pipe. The first pipe is connected to the combustion housing. The second pipe is connected to the tangential inflow structure.

In an embodiment, the secondary-air channel includes a radial channel extending in a radial direction and an axial channel extending in an axial direction and fluid communicating with the radial channel. One end of the radial channel is in fluid communication with the external environment, and the other end of the radial channel is in fluid communication with one end of the axial channel. The other end of the axial channel is in fluid communication with the combustion chamber. The plurality of axial vanes are arranged in the axial channel.

In an embodiment, the tangential inflow structure includes a tangential structure, and the tangential structure is arranged on top of the secondary-air pipes and cooperatively defines the swirl-flow pre-combustion chamber with an inner wall of the second pipe.

In an embodiment, an inner tangential channel and an outer tangential channel are defined in the tangential structure. The inner tangential channel and the outer tangential channel are both in fluid communication with the swirl-flow pre-combustion chamber. The outer tangential channel is configured for conveying air, and the inner tangential channel is configured for conveying fuel gas.

In an embodiment, the inner tangential channel and the outer tangential channel constitute a pair of channels. A plurality of pairs of channels are defined in the tangential structure. The plurality of pairs of channels are disposed along an outer peripheral surface of the tangential structure and spaced from each other.

In an embodiment, the inner tangential channel and the outer tangential channel are parallel to and spaced from each other.

In an embodiment, the inner tangential channel is located at a clockwise side of the outer tangential channel.

In an embodiment, the combustion structure further includes a diverging pipe, and the diverging pipe is disposed between the combustion housing and the secondary-air pipe. In the direction from the pre-combustion chamber to the combustion housing, the diameter of the diverging pipe gradually increases to form a diverging chamber. The diverging chamber is in fluid communication with the swirl-flow pre-combustion chamber and the combustion chamber.

In an embodiment, the staged-flow adjustment assembly includes an acclivitous jetting pipe, a horizontal jetting pipe, a declivous jetting pipe all communicated with the combustion chamber. The horizontal jetting pipe is disposed on the combustion housing and extends along the horizontal direction. The acclivitous jetting pipe is located below the horizontal jetting pipe. One end of the acclivitous jetting pipe is disposed on the combustion housing, and the other end of the acclivitous jetting pipe extends away from the horizontal jetting pipe. The declivous jetting pipe is located above the horizontal jetting pipe. One end of the declivous jetting pipe is disposed on the combustion housing, and the other end of the declivous jetting pipe extends away from the horizontal jetting pipe.

In an embodiment, the staged-flow adjustment assembly further includes a first valve, a second valve, and a third valve. The first valve is disposed in the acclivitous jetting pipe and is configured to control on and off of air flow of the acclivitous jetting pipe. The second valve is disposed in the horizontal jetting pipe and is configured to control on and off of air flow of the horizontal jetting pipe. The third valve is disposed in the declivous jetting pipe and is configured to control on and off of air flow of the declivous jetting pipe.

In an embodiment, the number of the staged-flow adjustment assemblies is plural, and the plurality of staged-flow adjustment assemblies are evenly distributed on the outer peripheral surface of the combustion housing.

In operation of the atmosphere-adjustable multi-staged swirl ammonia burner of the present application, air and fuel gas are introduced to the swirl-flow pre-combustion chamber through the tangential inflow structure. Ammonia gas is introduced to the combustion chamber from the branched inlet pipe, passing through the central adjustment assembly. The spray shape of the ammonia gas can be adjusted by the central adjustment assembly. The overall combustion characteristics of the ammonia gas can be adjusted according to the surrounding combustion-supporting gas and air distribution status. The secondary-air structure can deliver swirling secondary air to the combustion chamber. The staged-flow adjustment assembly can deliver staged airflows to the combustion chamber. Through the secondary-air structure and the staged-flow adjustment assembly, multi-staged airflows or staged combustion of fuel can be built to reduce generation of $NO_x$ during the combustion process. The atmosphere-adjustable multi-staged swirl ammonia burner of the present application, through the combination of the combustion housing, the pre-combustion chamber, the tangential inflow structure, the central adjustment assembly, the secondary-air structure, and the staged-flow adjustment assembly, makes the ammonia gas easy to ignite, improves the combustion stability, reduces the amount of $NO_x$ generated, and thus ensures the effect of ammonia combustion.

Figure 1:
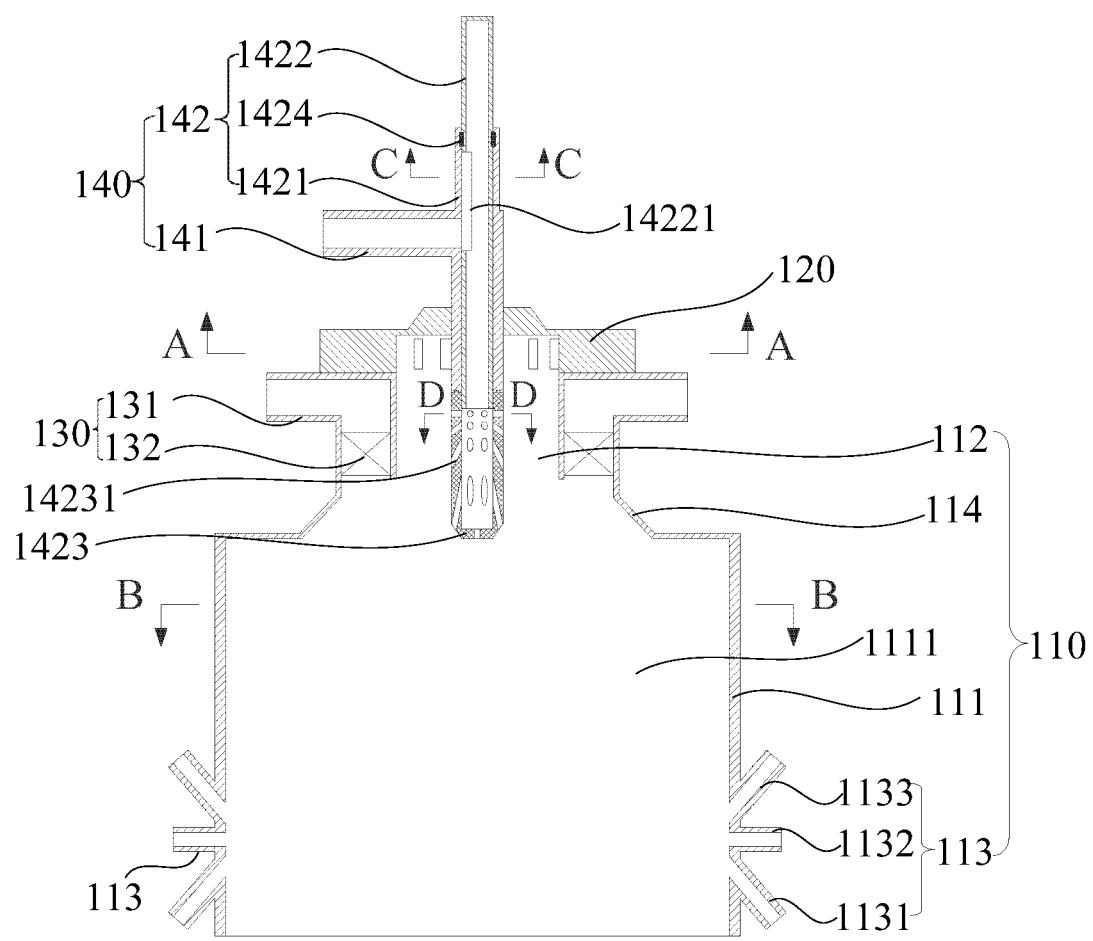
FIG. 1 is a cross-sectional view of an atmosphere-adjustable multi-staged swirl ammonia burner according to an embodiment of the present application.

Wherein: 100, multi-staged swirl ammonia burner; 110, combustion structure; 111, combustion housing; 1111, combustion chamber; 112, swirl-flow pre-combustion chamber; 113, staged-flow adjustment assembly; 1131, acclivitous jetting pipe; 1132, horizontal jetting pipe; 1133, declivous jetting pipe; 114, diverging pipe; 120, tangential inflow structure; 121, tangential structure; 122, outer tangential channel; 123, inner tangential channel; 130, secondary-air structure; 131, secondary-air pipe; 132, axial vane; 140, ammonia adjustment structure; 141, branched inlet pipe; 142, central adjustment assembly; 1421, central pipe; 1422, adjustment pipe; 14221, flow-adjustment hole; 1423, ejecting head; 14231, ejecting hole; 1424, sealing member.

DETAILED DESCRIPTION

In order to make the above objectives, features and advantages of the present application more clear and understandable, embodiments of the present application will be described in detail below with reference to the accompanying drawings. In the following description, many specific details are explained to make the present application fully understandable. However, the present application can be implemented in many other ways different from those described herein, and those skilled in the art can make similar improvements without departing from the connotation of the present application. Therefore, the present application is not limited by the specific embodiments disclosed below.

In the description of the present application, it should be understood that the terms "central", "longitudinal", "transverse", "length", "width", "thickness", "upper", "lower", "front", "rear", "left", "right", "vertical", "horizontal", "top", "bottom", "inner", "outer", "clockwise", "counter-clockwise", "axial", "radial", "circumferential", etc. indicate the orientations or positional relationships on the basis of the drawings. These terms are only for describing the present application and simplifying the description, rather than indicating or implying that the related devices or elements must have the specific orientations, or be constructed or operated in the specific orientations, and therefore cannot be understood as limitations of the present application.

In addition, the terms "first" and "second" are used merely as labels to distinguish one element having a certain name from another element having the same name, and cannot be understood as indicating or implying any priority, precedence, or order of one element over another, or indicating the quantity of the element. Therefore, the element modified by "first" or "second" may explicitly or implicitly includes at least one of the elements. In the description of the present application, "a plurality of" means at least two, such as two, three, etc., unless otherwise specifically defined.

In the present application, unless otherwise clearly specified and defined, the terms "installed", "connected", "coupled", "fixed" and other terms should be interpreted broadly. For example, an element, when being referred to as being "installed", "connected", "coupled", "fixed" to another element, unless otherwise specifically defined, may be fixedly connected, detachably connected, or integrated to the other element, may be mechanically connected or electrically connected to the other element, and may be directly connected to the other element or connected to the other element via an intermediate element. For those of ordinary skill in the art, the specific meaning of the above-mentioned terms in the present application can be understood according to specific circumstances.

In the present application, unless otherwise specifically defined, an element, when being referred to as being located "on" or "under" another element, may be in direct contact with the other element or contact the other element via an intermediate element. Moreover, the element, when being referred to as being located "on", "above", "over" another element, may be located right above or obliquely above the other element, or merely located at a horizontal level higher than the other element; the element, when being referred to as being located "under", "below", "beneath" another element, may be located right below or obliquely below the other element, or merely located at a horizontal level lower than the other element.

It should be noted that an element, when being referred to as being "fixed" or "mounted" to another element, may be directly fixed or mounted to the other element or via an intermediate element. Such terms as "vertical", "horizontal", "up", "down", "left", "right" and the like used herein are for illustrative purposes only and are not meant to be the only ways for implementing the present application.

Figure 12:
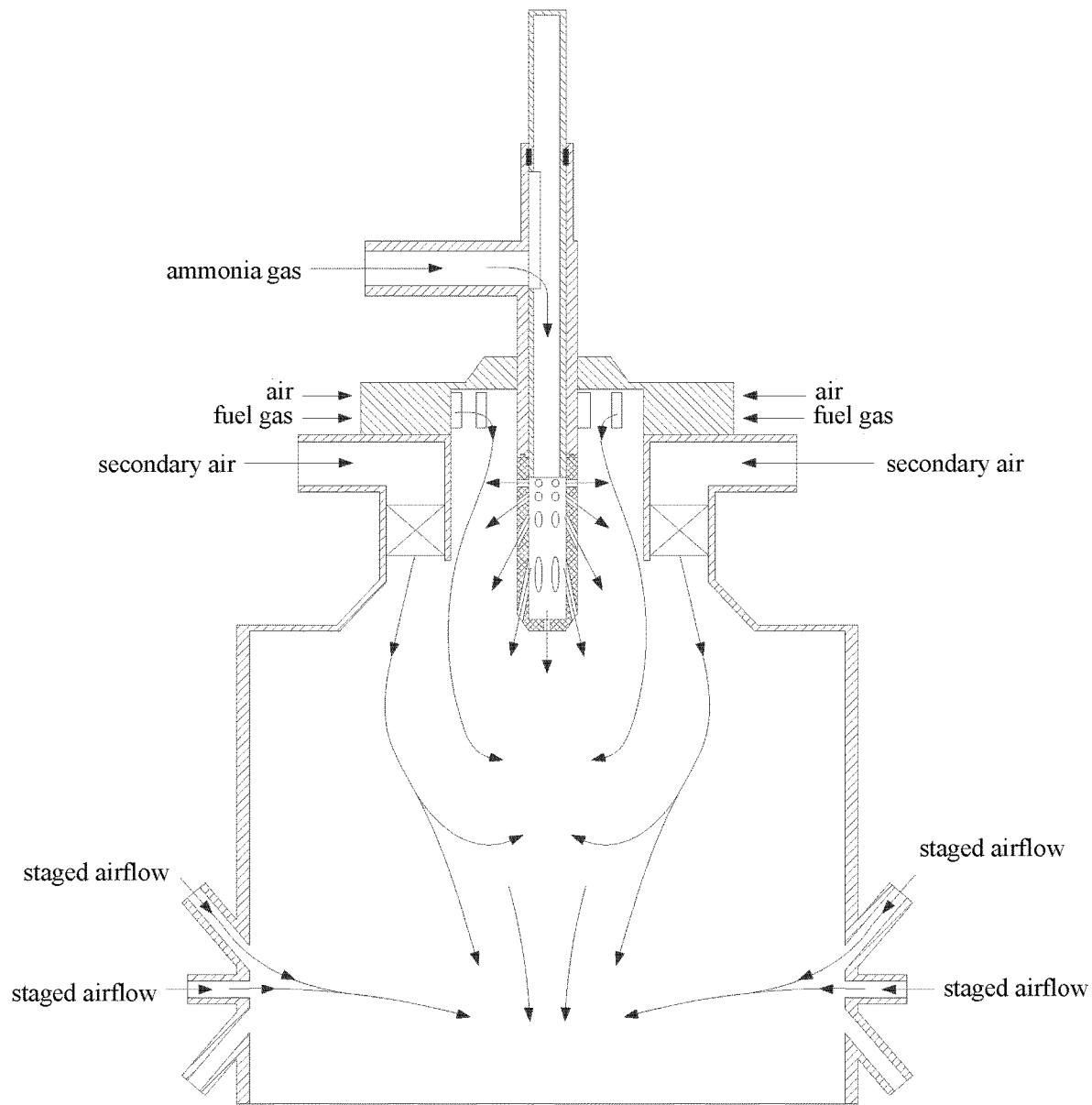
FIG. 12 is a schematic view showing gas flows in the atmosphere-adjustable multi-staged swirl ammonia burner shown in FIG. 1.

Referring to FIG. 1 and FIG. 12, the present application provides an atmosphere-adjustable multi-staged swirl ammonia burner 100. The atmosphere-adjustable multi-staged swirl ammonia burner 100 can realize stable combustion of ammonia, reduce $NO_x$ generation, and ensure combustion effect, and can also realize flexible adjustment of spray shape of ammonia gas to meet the usage requirements of different working conditions. The specific structure of the atmosphere-adjustable multi-staged swirl ammonia burner 100 is detailed described as follows.

Referring to FIG. 1 and FIG. 12, in an embodiment, the atmosphere-adjustable multi-staged swirl ammonia burner 100 includes a combustion structure 110, a tangential inflow structure 120, a secondary-air structure 130, and an ammonia adjustment structure 140. The combustion structure 110 includes a swirl-flow pre-combustion chamber 112, a combustion housing 111, and a staged-flow adjustment assembly 113 that are sequentially arranged. The swirl-flow pre-combustion chamber 112 is fluid communicated with a combustion chamber 1111 defined by the combustion housing 111. The staged-flow adjustment assembly 113 is disposed on a side wall of the combustion housing 111 and is adjacent to an end of the combustion housing 111 away from the swirl-flow pre-combustion chamber 112. The staged-flow adjustment assembly 113 is fluid communicated with the combustion chamber 1111, and is configured to introduce staged airflows into the combustion chamber 1111. The tangential inflow structure 120 is disposed on the top of the swirl-flow pre-combustion chamber 112. The tangential inflow structure 120 is fluid communicated with the swirl-flow pre-combustion chamber 112, and is configured to introduce air and fuel gas into the swirl-flow pre-combustion chamber 112. The secondary-air structure 130 is disposed between the combustion housing 111 and the tangential inflow structure 120. The secondary-air structure 130 and the tangential inflow structure 120 surround and form the swirl-flow pre-combustion chamber 112. The secondary-air structure 130 is fluid communicated with the combustion chamber 1111 and is configured to introduce secondary air into the combustion chamber 1111. The ammonia adjustment structure 140 extends through the tangential inflow structure 120 into the combustion chamber 1111. The ammonia adjustment structure 140 includes a branched inlet pipe 141 and a central adjustment assembly 142. One end of the central adjustment assembly 142 extends through the tangential inflow structure 120 into the combustion structure 110. One end of the branched inlet pipe 141 is fluid communicated with the central adjustment assembly 142 and thus fluid communicated with the combustion chamber 1111. The branched inlet pipe 141 is configured to introduce ammonia gas, and the central adjustment assembly 142 is configured to adjust the spray shape of the ammonia gas introduced from the branched inlet pipe 141.

The combustion structure 110 is the main structure of the multi-staged swirl ammonia burner 100 for combustion. The combustion of ammonia occurs in the combustion structure 110. In order to facilitate the description of the structure and features of the multi-staged swirl ammonia burner 100, the present application is described on the basis of the top, bottom, left, and right of the multi-staged swirl ammonia burner 100 shown in FIG. 1. The combustion structure 110 is located at the bottom of the multi-staged swirl ammonia burner 100, and the secondary-air structure 130 is disposed above the combustion structure 110. The secondary-air structure 130 is configured to introduce oxygen gas or air required for the combustion of ammonia into the combustion structure 110 to promote the stable combustion of ammonia in the combustion structure 110.

The tangential inflow structure 120 is disposed above the secondary-air structure 130. The tangential inflow structure 120 is configured to introduce air and fuel gas into the combustion structure 110. The fuel gas in the present application refers to the combustion-supporting gas, which can be natural gas, hydrogen gas, or other flammable gas. It can be understood that because the tangential inflow structure 120 is disposed above the secondary-air structure 130, after air and fuel gas are introduced into the combustion structure 110 through the tangential inflow structure 120, they together form a high-speed swirling flow, which can generate a low-pressure zone at the top center area of the combustion structure 110 to promote rapid preheating, pyrolysis and ignition of ammonia, and to suppress the generation of $NO_x$.

The ammonia adjustment structure 140 is disposed in the tangential inflow structure 120. One end of the ammonia adjustment structure 140 extends out from the tangential inflow structure 120, and the other end of the ammonia adjustment structure 140 passes through the tangential inflow structure 120 and extends into the combustion structure 110. The ammonia adjustment structure 140 can introduce ammonia into the combustion structure 110, so that the ammonia is combusted in the combustion structure 110. Moreover, the ammonia adjustment structure 140 can also adjust the flow rate and the spray shape of ammonia gas introduced into the combustion structure 110, which helps to uniformly inject ammonia gas into the high-temperature combustion-supporting flame to achieve rapid heating and pyrolysis of ammonia gas, which is beneficial to the subsequent ammonia combustion and heat emission. The ammonia adjustment structure 140 can also flexibly adjust the overall combustion characteristics of ammonia according to different surrounding fuel gas and air distribution conditions to ensure stable and efficient combustion.

The combustion structure 110 includes the swirl-flow pre-combustion chamber 112, the combustion housing 111, and the staged-flow adjustment assembly 113. The swirl-flow pre-combustion chamber 112 is located above the combustion housing 111, and the swirl-flow pre-combustion chamber 112 is configured to pre-combust ammonia gas and to provide air and fuel gas for the pre-combustion of the ammonia gas. The combustion housing 111 is hollow, and the space enclosed thereby is the combustion chamber 1111. Along the direction of the central axis (i.e., the vertical direction) of the combustion housing 111, the swirl-flow pre-combustion chamber 112 and the combustion chamber 1111 are arranged in sequence. The combustion chamber 1111 is configured to achieve the combustion of ammonia Ammonia is introduced into the combustion chamber 1111 by the ammonia adjustment structure 140 for combustion. The staged-flow adjustment assembly 113 is disposed on the side wall of the combustion housing 111, and is located below the combustion housing 111, that is, away from the swirl-flow pre-combustion chamber 112. The staged-flow adjustment assembly 113 introduces staged airflow into the combustion chamber 1111, which can create multi-staged airflows or staged combustion of fuel, and reduce the generation of $NO_x$ in the combustion process.

The secondary-air structure 130 is disposed above the combustion housing 111. The tangential inflow structure 120 is disposed above the secondary-air structure 130. The secondary-air structure 130 and the tangential inflow structure 120 surround and form the swirl-flow pre-combustion chamber 112. The tangential inflow structure 120 is fluid communicated with the swirl-flow pre-combustion chamber 112. The tangential inflow structure 120 introduces air and fuel gas into the swirl-flow pre-combustion chamber 112. The secondary-air structure 130 is fluid communicated with the combustion chamber 1111 of the combustion housing 111, and is configured to introduce secondary air into the combustion chamber 1111 to provide oxygen gas for the combustion of ammonia in the combustion chamber 1111.

After air and fuel gas are introduced into the swirl-flow pre-combustion chamber 112 through the tangential inflow structure 120, the air and fuel gas can be rapidly mixed and swirled at a high speed in the swirl-flow pre-combustion chamber 112, forming a low-pressure zone inside the high-speed swirling flow, which is beneficial to the formation of the first-stage high-temperature fluid recirculation zone, to promote the rapid preheating, pyrolysis and ignition of ammonia, and to suppress the generation of $NO_x$. Meanwhile, the secondary-air structure 130 introduces high-speed swirling secondary air to the combustion chamber 1111 to supplement the required oxygen for ammonia combustion. In addition, due to the high-speed swirl of the secondary-air, the central area of the combustion chamber 1111 forms a low-pressure zone, which is the second-stage high-temperature fluid recirculation zone for further promoting the stable combustion of ammonia. The low-pressure zone creates a high-temperature reducing atmosphere to suppress the generation of $NO_x$.

The ammonia adjustment structure 140 includes the branched inlet pipe 141 and the central adjustment assembly 142. One end of the central adjustment assembly 142 extends through the tangential inflow structure 120 into the combustion chamber 1111. That is, a part of the central adjustment assembly 142 is exposed outside from the tangential inflow structure 120. One end of the branched inlet pipe 141 is fluid communicated with the central adjustment assembly 142 and thus fluid communicated with the combustion chamber 1111 through the central adjustment assembly 142. Another end of the branched inlet pipe 141 is connected to an ammonia source. Ammonia gas is introduced into the combustion chamber 1111 by the branched inlet pipe 141 and the central adjustment assembly 142. Moreover, the central adjustment assembly 142 can adjust the flow rate and spray shape of the ammonia gas introduced into the combustion chamber 1111, so that the overall combustion characteristics of ammonia gas can be flexibly adjusted according to different surrounding fuel gas and air distribution conditions to ensure the ammonia combustion effect.

Through the combustion housing 111, the pre-combustion chamber, the tangential inflow structure 120, the central adjustment assembly 142, the secondary-air structure 130, and the staged-flow adjustment assembly 113 of the multi-staged swirl ammonia burner 100 of the above embodiment, ammonia gas can be easily ignited, the combustion is stable, the amount of generated $NO_x$ is reduced, and the combustion effect is ensured.

Figure 8:
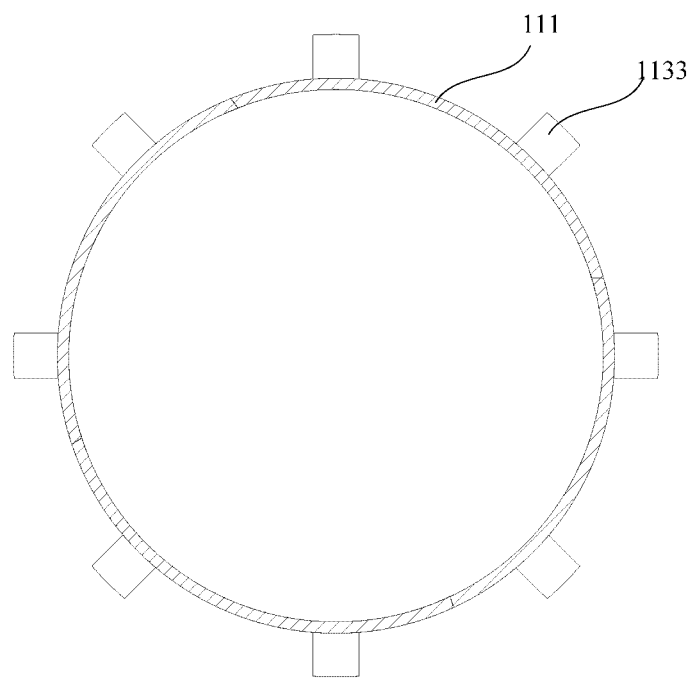
FIG. 8 is a cross-sectional view of the atmosphere-adjustable multi-staged swirl ammonia burner along the line B-B shown in FIG. 1.

Referring to FIG. 1, FIG. 8 and FIG. 12, optionally, the combustion housing 111 has a cylindrical structure to enclose a cylindrical combustion chamber 1111. In some embodiments of the present application, the outer shape of the combustion housing 111 can be square or other shapes, which are not limited herein as long as the combustion chamber 1111 formed inside is cylindrical to ensure the combustion effect. Of course, in other embodiments of the present application, the cross-sectional inner shape of the combustion chamber 1111 can be square or other shapes. Optionally, the combustion housing 111, the secondary-air structure 130, the tangential inflow structure 120, and the ammonia adjustment structure 140 are coaxially arranged.

Referring to FIG. 1 to FIG. 3 and FIG. 11, in an embodiment, the central adjustment assembly 142 includes a hollow central pipe 1421 and an adjustment pipe 1422. One end of the central pipe 1421 passes through the tangential inflow structure 120 and fluid communicates with the combustion chamber 1111. The adjustment pipe 1422 defines a flow-adjustment hole 14221 extending along the axial direction of the adjustment pipe 1422. The branched inlet pipe 141 is connected to the central pipe 1421 and is fluid communicated with the central pipe 1421 through the adjustment pipe 1422. The adjustment pipe 1422 is movably arranged in the central pipe 1421 for adjusting the fluid communication area between the flow-adjustment hole 14221 and the branched inlet pipe 141.

The central pipe 1421 is fixedly installed on the tangential inflow structure 120. One end of the central pipe 1421 passes through the tangential inflow structure 120 and extends to the top area of the combustion chamber 1111, and the other end of the central pipe 1421 extends upward from the tangential inflow structure 120. The central pipe 1421 has a hollow structure and is configured for movably installing the adjustment pipe 1422 therein. The adjustment pipe 1422 can rise or fall along the inner wall of the central pipe 1421. The outer wall of the adjustment pipe 1422 defines the flow-adjustment hole 14221. The flow-adjustment hole 14221 is fluid communicated with the inside of the adjustment pipe 1422 and thus fluid communicated with the combustion chamber 1111. One end of the branched inlet pipe 141 is fixedly connected to the central pipe 1421. The branched inlet pipe 141 is fluid communicated with the inside of the adjustment pipe 1422 through the flow-adjustment hole 14221 and thus fluid communicated with the combustion chamber 1111.

In this way, when the branched inlet pipe 141 introduces ammonia gas, the ammonia gas can enter the adjustment pipe 1422 from the branched inlet pipe 141 through the flow-adjustment hole 14221, and enter the combustion chamber 1111, thereby achieving the introduction of ammonia gas. In addition, the adjustment pipe 1422 can be moved up and down in the central pipe 1421. When the flow-adjustment hole 14221 is completely in alignment with the branched inlet pipe 141, the flow rate of ammonia gas delivered by the branched inlet pipe 141 is the largest. When the adjustment pipe 1422 is moved up or down to reduce the communication area between the flow-adjustment hole 14221 and the branched inlet pipe 141, the flow rate of the ammonia gas delivered by the branched inlet pipe 141 gradually decreases.

In an embodiment, the adjustment pipe 1422 includes a first pipe body, a second pipe body, and a third pipe body that are sequentially connected. The first pipe body and the third pipe body are located at two ends of the second pipe body. The outer wall of the second pipe body has a gap, which is the flow-adjustment hole 14221. Optionally, the first pipe body, the second pipe body, and the third pipe body are an integrated structure.

Figure 2:
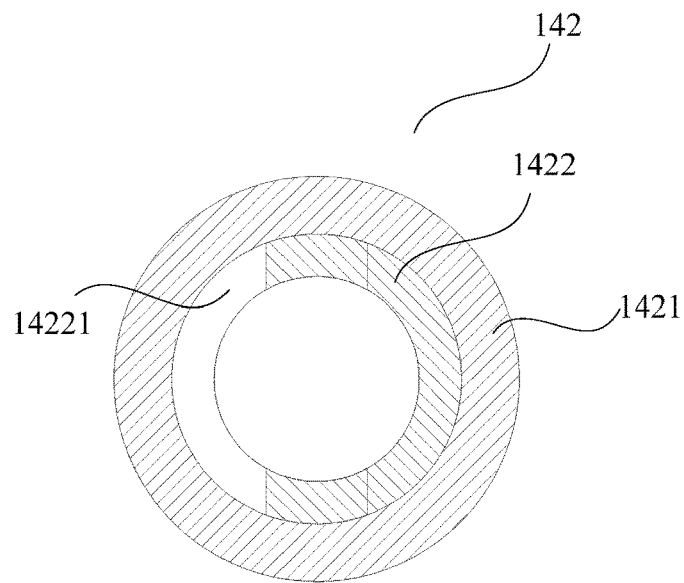
FIG. 2 is a cross-sectional view of the atmosphere-adjustable multi-staged swirl ammonia burner along the line C-C shown in FIG. 1.
Figure 3:
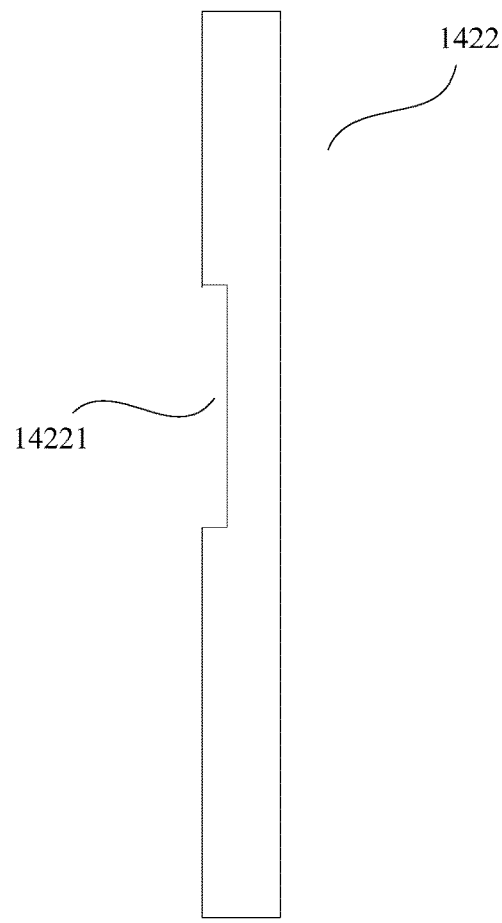
FIG. 3 is a schematic view of an adjustment pipe of the atmosphere-adjustable multi-staged swirl ammonia burner shown in FIG. 1.

Referring to FIG. 1 to FIG. 3, in an embodiment, the central pipe 1421 is a structure with open ends, and the adjustment pipe 1422 is a structure with one open end and one closed end. The open end of the adjustment pipe 1422 extends into the central pipe 1421 and the closed end of the adjustment pipe 1422 exposes from the central pipe 1421, which can prevent leakage of ammonia from the adjustment pipe 1422 and ensure the safety in use. Optionally, the central pipe 1421 and the adjustment pipe 1422 are coaxially arranged. Optionally, the central pipe 1421 is coaxially arranged with the combustion housing 111 and the swirl-flow pre-combustion chamber 112.

Referring to FIG. 1 and FIG. 11, in an embodiment, the central adjustment assembly 142 further includes a sealing member 1424, and the sealing member 1424 is disposed between the central pipe 1421 and the adjustment pipe 1422. The sealing member 1424 guarantees the sealing between the central pipe 1421 and the adjustment pipe 1422 to avoid the leakage of ammonia gas between the central pipe 1421 and the adjustment pipe 1422. Optionally, the sealing member 1424 is a sealing ring. Of course, in other embodiments of the present application, the sealing member 1424 can be other structures that can achieve sealing, such as sealant or sealing tape.

Referring to FIG. 1 and FIG. 3, in an embodiment, the projection of the flow-adjustment hole 14221 in the axial direction of the adjustment pipe 1422 is rectangular. That is, in the vertical direction, the flow-adjustment hole 14221 is a rectangular gap on the adjustment pipe 1422. In an embodiment, the axial dimension of the flow-adjustment hole 14221 is greater than the diameter of the branched inlet pipe 141. In this way, when the branched inlet pipe 141 is completely in alignment with the flow-adjustment hole 14221, the branched inlet pipe 141 delivers the maximum flow rate of ammonia.

Figure 9:
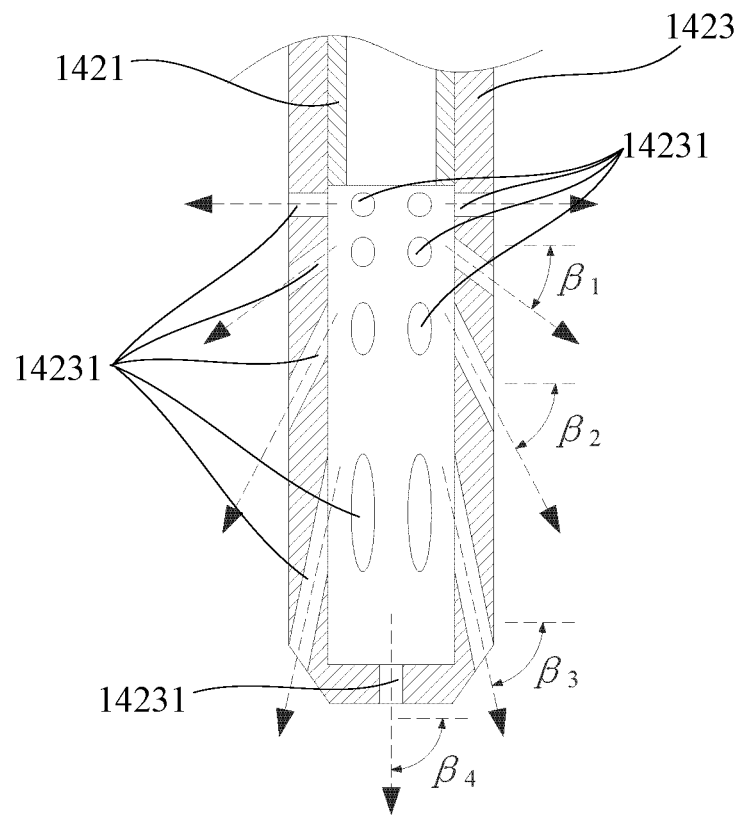
FIG. 9 is a schematic view of an ejecting head of the atmosphere-adjustable multi-staged swirl ammonia burner shown in FIG. 1.
Figure 10:
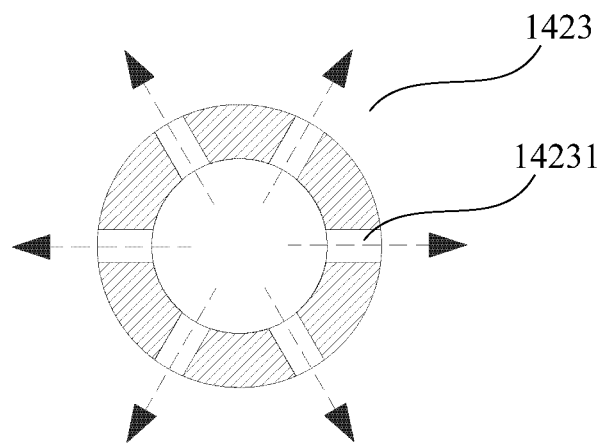
FIG. 10 is a cross-sectional view of the atmosphere-adjustable multi-staged swirl ammonia burner along the line D-D shown in FIG. 1.

Referring to FIG. 1, FIG. 9 and FIG. 11, in an embodiment, the central adjustment assembly 142 includes a hollow ejecting head 1423. The ejecting head 1423 is mounted to the end of the central pipe 1421 located in the combustion chamber 1111, and the ejecting head 1423 has a plurality of ejecting holes 14231. The plurality of ejecting holes 14231 are distributed in rows which are spaced along the axial direction of the central pipe 1421, and a lowermost ejecting hole 14231 is located at the bottom of the ejecting head 1423 and coincides with the vertical central axis of the central pipe 1421. The ejecting holes 14231 in the same row are arranged at the same horizontal level. The ejecting holes 14231 are configured to inject ammonia gas into the combustion chamber 1111. Optionally, the ejecting head 1423 and the central pipe 1421 are coaxially arranged.

The ejecting head 1423 is configured to inject ammonia gas at different angles, so as to meet the usage requirements under different working conditions. Specifically, the ejecting head 1423 has a cavity inside. After the ejecting head 1423 is mounted onto the central pipe 1421, the cavity of the ejecting head 1423 is fluid communicated with the inside channel of the central pipe 1421, so that ammonia gas can be delivered to the ejecting head 1423. In addition, the ejecting head 1423 has a plurality of ejecting holes 14231. The ejecting holes 14231 are communicated with the cavity inside the ejecting head 1423 and are capable of ejecting ammonia gas from the ejecting head 1423. The plurality of ejecting holes 14231 are arranged on the side wall of the ejecting head 1423, and are arranged in multiple rows from top to bottom. The ejecting holes 14231 in each row are arranged at intervals along the circumference of the ejecting head 1423. The bottom of the ejecting head 1423 is also provided with an ejecting hole 14231, which extends in the vertical direction and coincides with the vertical axis of the central pipe 1421, so that this lowermost ejecting hole 14231 can inject ammonia gas in the vertical direction.

The adjustment pipe 1422 is capable of being inserted into the ejecting head 1423. When the adjustment pipe 1422 moves downward in the central pipe 1421, the lower end of the adjustment pipe 1422 gradually blocks the ejecting holes 14231, reducing the number of ejecting holes 14231 that are capable of ejecting ammonia gas, so as to change the flow rate and spray shape of ammonia gas to meet combustion requirements of ammonia under different working conditions, to ensure uniform mixing between ammonia and surrounding high-temperature flames, and to promote turbulent flow of ammonia and high-temperature flames, thereby promoting rapid heating, pyrolysis and ignition of ammonia.

Referring to FIG. 1, FIG. 9 and FIG. 11, in an embodiment, the ejecting holes 14231 in different rows can extend in different directions, and the extending angle between the extending direction of each ejecting hole 14231 and the horizontal direction is greater than or equal to 0° and less than or equal to 90°. Along the axial direction of the central pipe 1421 from the bottom to the top of the ejecting head 1423, the extending angle of the ejecting holes 14231 gradually decreases from 90° to 0°. The extending angle has different values in different rows of ejecting holes 14231 and has the same value in the same row of ejecting holes 14231. The extending angle between the extending directions of the ejecting holes 14231 in the uppermost row and the horizontal direction is the smallest, and the extending angle between the extending direction of the ejecting hole 14231 in the lowermost row and the horizontal direction is the largest. The extending angle between the extending directions of the ejecting holes 14231 and the horizontal direction gradually increases from the upper rows to the lower rows.

By setting the ejecting holes 14231 with different extending angles in different rows, ammonia gas can be sprayed through the ejecting head 1423 in an umbrella shape to the surroundings, which is beneficial to the uniform mixing of the ammonia gas and the surrounding high-temperature flames, and increases the turbulent flow of the ammonia gas and the high-temperature flames, thereby promoting the rapid heating, pyrolysis and ignition of ammonia.

Optionally, the number of rows of the ejecting holes 14231 is four to eight, meaning that the number of rows of the ejecting holes 14231 can be four, five, six, seven, or eight. In the present application, the ejecting holes 14231 arranged in five rows are taken as an example for description. In an embodiment, the number of rows of the ejecting holes 14231 from top to bottom is five. The extending angle between the extending directions of the ejecting holes 14231 of the first row and the horizontal direction is 0° to 5°. The extending angle between the extending directions of the ejecting holes 14231 of the second row and the horizontal direction is 25° to 35°. The extending angle between the extending directions of the ejecting holes 14231 of the third row and the horizontal direction is 55° to 65°. The extending angle between the extending directions of the ejecting holes 14231 of the fourth row and the horizontal direction is 70° to 80°. The ejecting hole 14231 of the fifth row is arranged at the bottom of the ejecting head 1423 and extends along the vertical direction.

It should be noted that the above range includes the values at both ends of the range, e.g., the extending angle between the extending directions of the ejecting holes 14231 of the first row and the horizontal direction is 0° to 5°, which can be 0° or 5°, or any values between 0° and 5°. By setting the ejecting holes 14231 with different extending angles in different rows, ammonia gas can be sprayed through the ejecting head 1423 in an umbrella shape to the surroundings, which is beneficial to the uniform mixing of the ammonia gas and the surrounding high-temperature flames, and increases the turbulent flow of the ammonia gas and the high-temperature flames, thereby promoting the rapid heating, pyrolysis and ignition of ammonia.

In a specific embodiment, referring to FIG. 1, FIG. 9 and FIG. 11, the five rows of ejecting holes 14231 extend at an extending angle with respect to the horizontal direction. From top to bottom, the value of the extending angle between the extending directions of the ejecting holes 14231 in the five rows and the horizontal direction is increased from 0° to 90°. Taking FIG. 9 as an example, the values of the extending angle between the extending directions of the five rows of ejecting holes 14231 and the horizontal direction, from top to bottom, are as follows: The extending angle between the extending directions of the ejecting holes 14231 of the first row (i.e., the uppermost row) and the horizontal direction is 0°. The extending angle $\beta_1$ between the extending directions of the ejecting holes 14231 of the second row and the horizontal direction is 30°. The extending angle $\beta_2$ between the extending directions of the ejecting holes 14231 of the third row and the horizontal direction is 60°. The extending angle $\beta_3$ between the extending directions of the ejecting holes 14231 of the fourth row and the horizontal direction is 75°. The extending angle $\beta_4$ between the extending directions of the ejecting holes 14231 of the fifth row (i.e., the lowermost row) and the horizontal direction is 90°.

Figure 11A:
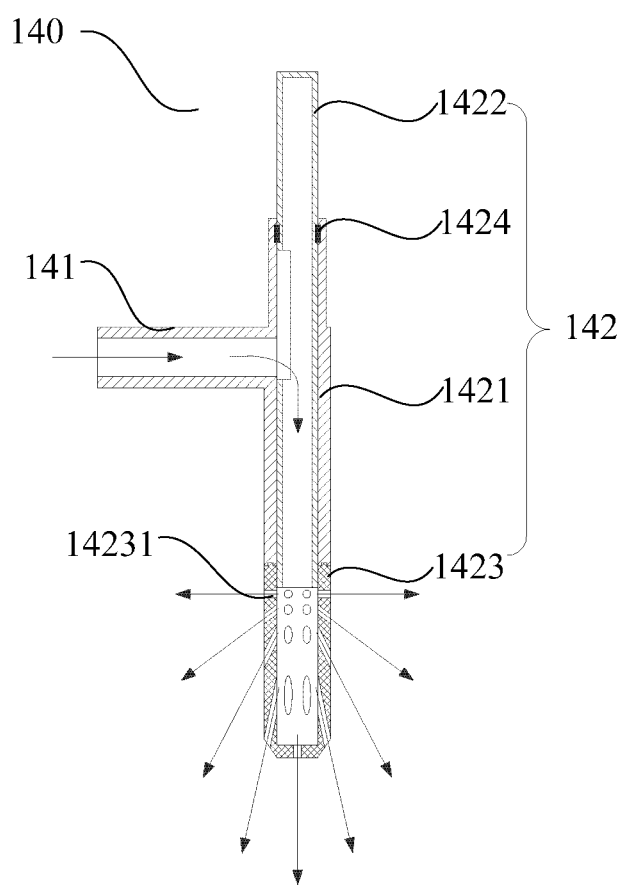
FIGS. 11A to 11C are schematic views showing jet angles of ejecting holes of the atmosphere-adjustable multi-staged swirl ammonia burner shown in FIG. 1.
Figure 11B:
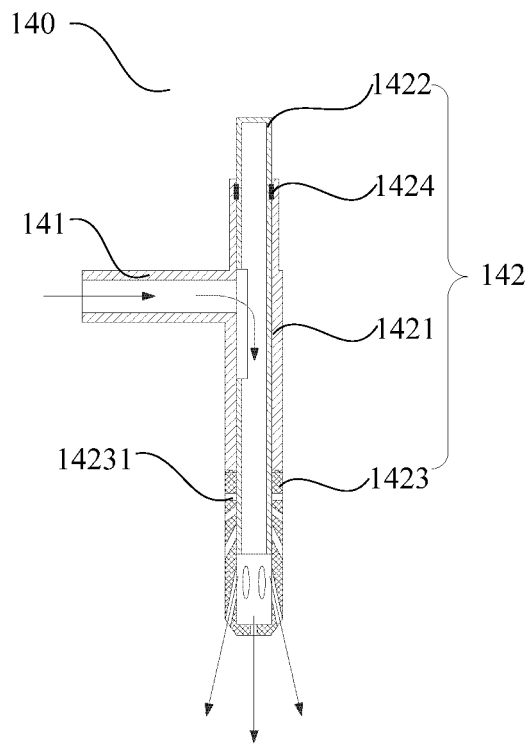
Figure 11C:
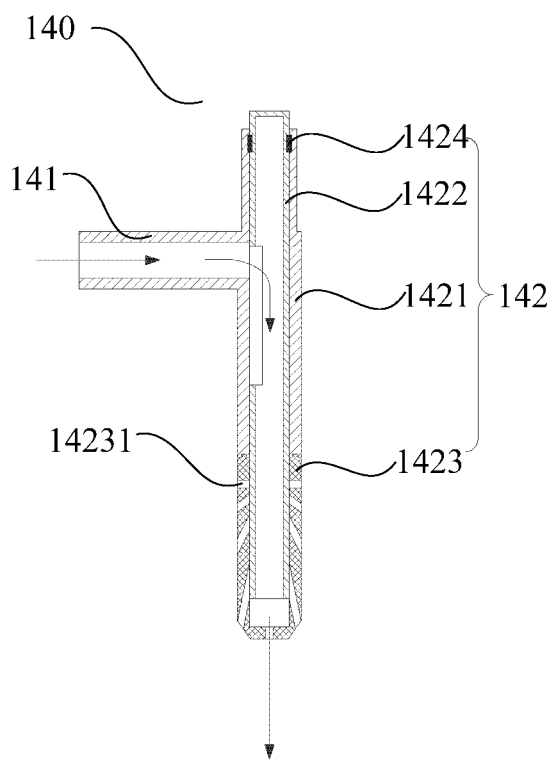

By moving up and down the adjustment pipe 1422 to adjust the relative position of the adjustment pipe 1422 in the central pipe 1421, the overall effective area of the rows of the ejecting holes 14231 can be flexibly adjusted, thereby changing the position and overall spray shape of ammonia gas ejected from the ejecting head 1423. Referring to FIG. 11A, when the side wall of the adjustment pipe 1422 does not block any row of ejecting holes 14231, the sprayed ammonia flow overall has a shape of opened umbrella that expands to 180°. Referring to FIG. 11B, as the adjustment pipe 1422 moves downward and gradually blocks the ejecting holes 14231 row by row, the angle of the umbrella shaped ammonia flow gradually decreases. Referring to FIG. 11C, when the adjustment pipe 1422 moves down to the end of the ejecting head 1423, the ammonia flow is vertically sprayed.

By setting the ejecting holes 14231 with different extending angles in different rows, the ammonia gas can be sprayed through the ejecting head 1423 in an umbrella shape to the surroundings, which is beneficial to the uniform mixing of the ammonia gas and the surrounding high-temperature flames, increases the turbulent flow of the ammonia gas and the high-temperature flames, and is beneficial to the uniform injection of the ammonia gas into the surrounding high-temperature combustion-supporting flames around the ejecting head 1423, thereby promoting the rapid heating, pyrolysis and ignition of ammonia.

Figure 7:
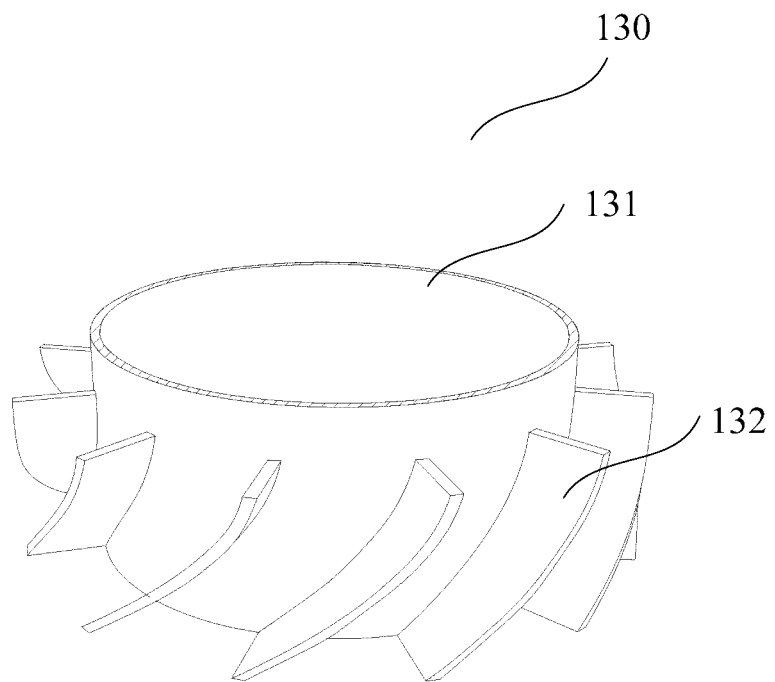
FIG. 7 is a partial view of a secondary-air structure of the atmosphere-adjustable multi-staged swirl ammonia burner shown in FIG. 1.

Referring to FIG. 1 and FIG. 7, in an embodiment, the secondary-air structure 130 includes two coaxially arranged secondary-air pipes 131 and a plurality of axial vanes 132. A secondary-air channel is defined between the two coaxially arranged secondary-air pipes 131. The coaxially arranged secondary-air pipes 131 are connected between the combustion housing 111 and the tangential inflow structure 120. The axial vanes 132 are disposed in the secondary-air channel. The coaxially arranged secondary-air pipes 131 form a ring shape, surrounding the circumference of the swirl-flow pre-combustion chamber 112. The secondary-air channel is configured to introduce the secondary air. One end of the secondary-air channel is communicated with the external environment, and the other end of the secondary-air channel is communicated with the combustion chamber 1111. The axial vanes 132 are disposed at the end of the secondary-air pipes 131 adjacent to the combustion chamber 1111. The number of the axial vanes 132 is plural, and the plurality of axial vanes 132 are evenly distributed in the secondary-air channel along the circumferential direction of the swirl-flow pre-combustion chamber 112.

The secondary air enters the secondary-air pipe 131, and is transported through the secondary-air pipe 131 to the combustion chamber 1111. In the process of conveying the secondary air by the secondary-air pipes 131, the secondary air passing by the axial vanes 132 can be guided by the axial vanes 132, so as to generate high-speed swirl and enter the combustion chamber 1111, to supply oxygen for the combustion of ammonia. Moreover, the high-speed swirling of gas flow forms a low-pressure zone in the central area of the combustion chamber 1111, which is the second-stage high-temperature fluid recirculation zone for further promoting the stable combustion of the ammonia flow. The low-pressure zone creates a high-temperature reducing atmosphere to suppress the generation of $NO_x$.

In an embodiment, the coaxially arranged secondary-air pipes 131 include a first pipe and a second pipe. The first pipe is sleeved outside the second pipe to form the secondary-air channel for conveying the secondary air. The first pipe is connected to the combustion housing 111 at the lower side, and the second pipe abuts against the above tangential inflow structure 120.

The first pipe is the outer pipe in the secondary-air pipes 131, and the second pipe is the inner pipe in the secondary-air pipes 131. The first pipe and the second pipe cooperatively define the secondary-air channel, and the secondary-air is delivered through the secondary-air channel. In addition, the bottom of the first pipe is connected to the top of the combustion housing 111 (e.g., via a diverging pipe 114, which will be described in detail later), and the second pipe is connected to the tangential inflow structure 120 to form the swirl-flow pre-combustion chamber 112. In this way, the secondary air can enter the swirl-flow pre-combustion chamber 112 through the secondary-air channel. In an embodiment, the first and second pipes are both coaxially arranged with the central pipe 1421, the adjustment pipe 1422, and the ejecting head 1423.

In an embodiment, the secondary-air channel includes a radial channel extending in the radial direction and an axial channel extending in the axial direction and fluid communicating with the radial channel. One end of the radial channel is fluid communicated with the external environment, and the other end of the radial channel is fluid communicated with one end of the axial channel. The other end of the axial channel is fluid communicated with the combustion chamber 1111. The axial vanes 132 are arranged in the axial channel. The radial channel is arranged above the combustion housing 111 along the radial direction of the combustion housing 111, and the axial channel is connected to the end of the radial channel along the axial direction of the combustion housing 111, and that is, the radial channel is perpendicular to the axial channel. The axial vanes 132 are arranged in the axial channel. The secondary air flows along the radial channel and then enters the axial channel, and then enters the combustion chamber 1111 after being guided by the axial vanes 132.

The secondary air, which is a certain amount of air, flows into the combustion chamber 1111 from the radial channel. In the process of flowing through the axial channel, the secondary air is guided by the axial vanes 132 located inside the axial channel to generate a high-speed swirling flow, which flows into a diverging chamber, which will be described hereinafter, and the combustion chamber 1111, to supplement the required amount of oxygen for the combustion of ammonia. Due to the formation of the low pressure zone in the central area of the combustion chamber 1111 during the high-speed swirling of the gas flow, the second-stage high-temperature fluid recirculation zone can be formed to further promote the stable combustion of ammonia, while creating a high-temperature reducing atmosphere to suppress generation of $NO_x$.

Figure 4:
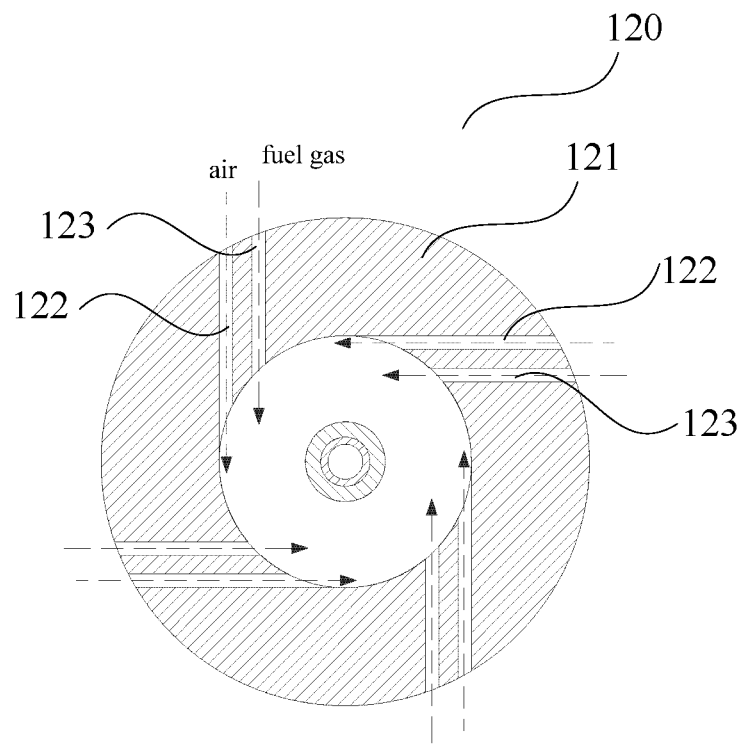
FIG. 4 is a cross-sectional view of the atmosphere-adjustable multi-staged swirl ammonia burner along the line A-A shown in FIG. 1.

Referring to FIG. 1, FIG. 4 and FIG. 12, in an embodiment, the tangential inflow structure 120 includes a tangential structure 121. The tangential structure 121 is arranged on the top of the secondary-air pipes 131 and cooperatively defines the swirl-flow pre-combustion chamber 112 with the inner wall of the second pipe. The tangential structure 121 is the main structure of the tangential inflow structure 120, and is located on the top of the secondary-air pipes 131 and forms the swirl-flow pre-combustion chamber 112 with the secondary-air pipes 131. An inner tangential channel 123 and an outer tangential channel 122 are defined in the tangential structure 121. The inner tangential channel 123 and the outer tangential channel 122 are both fluid communicated with the swirl-flow pre-combustion chamber 112 and are adjacent to each other. The outer tangential channel 122 is configured for conveying air, and the inner tangential channel 123 is configured for conveying fuel gas.

The inner tangential channel 123 and the outer tangential channel 122 both penetrate through the tangential structure 121 and can be fluid communicated with the swirl-flow pre-combustion chamber 112. Fuel gas is introduced to the swirl-flow pre-combustion chamber 112 through the inner tangential channel 123, and air is introduced to the swirl-flow pre-combustion chamber 112 through the outer tangential channel 122. Since the inner tangential channel 123 and outer tangential channel 122 are adjacent to each other and arranged in a tangential direction of the swirl-flow pre-combustion chamber 112, the fuel gas and part of the air will be rapidly mixed and swirled at a high speed in the swirl-flow pre-combustion chamber 112, forming a low-pressure zone at the center of the high-speed swirling gas flow, which is beneficial to the formation of the first-stage high-temperature fluid recirculation zone to promote the rapid preheating, pyrolysis and ignition of ammonia ejected from the ejecting head 1423 and to suppress the generation of $NO_x$.

Moreover, by adjusting the flow rate ratio of the fuel gas in the inner tangential channel 123 to the air in the outer tangential channel 122, the mutual ejection effect of the fuel gas flow in the inner tangential channel 123 and the air flow in the outer tangential channel 122 can be changed, and the stoichiometric ratio of the fuel gas to the air during the combustion can be changed, thereby changing the combustion status of the fuel gas and the adjacent air and realizing the flexible adjustment of the stoichiometric ratio in the combustion process.

Referring to FIG. 1, FIG. 4 and FIG. 12, in an embodiment, the number of the inner tangential channels 123 is plural, and is equal to the number of the outer tangential channels 122. Each inner tangential channel 123 is disposed corresponding to one outer tangential channel 122 to form a pair of channels. The plurality of pairs of channels are disposed along an outer peripheral surface of the tangential structure 121 and spaced from each other. Specifically, the plurality of inner tangential channels 123 are disposed along the outer peripheral surface of the tangential structure 121 and are disposed at intervals. In this way, the uniformity and stability of the swirling of the flows can be ensured. Optionally, the number of the inner tangential channels 123 is three, four or five, and the inner tangential channels 123 are evenly arranged along the circumference of the tangential structure 121.

Referring to FIG. 1, FIG. 4 and FIG. 12, in an embodiment, in each pair of channels, the inner tangential channel 123 and the outer tangential channel 122 are parallel to and spaced from each other. The plurality of pairs of channels are distributed around the central axis of the tangential structure 121. The outer tangential channels 122 respectively coincide with tangents to the circular inner wall of the tangential structure 121. The inner tangential channel 123 is located at the clockwise side of the outer tangential channel 122. In this way, the air and fuel gas can be rapidly mixed and swirled at a high speed in the swirl-flow pre-combustion chamber 112, and the low-pressure zone is formed inside the high-speed swirling gas flow, which is beneficial to the formation of the first-stage high-temperature fluid recirculation zone.

Referring to FIG. 1 and FIG. 12, in an embodiment, the combustion structure 110 further includes a diverging pipe 114. The diverging pipe 114 is disposed between the combustion housing 111 and the secondary-air pipes 131. In the direction from the pre-combustion chamber 112 to the combustion housing 111, the diameter of the diverging pipe 114 gradually increases to form a diverging chamber, which is in fluid communication with the swirl-flow pre-combustion chamber 112 and the combustion chamber 1111. The diverging pipe 114 has a hollow truncated cone shape, and the diverging pipe 114 is configured to realize the transitional connection between the combustion housing 111 and the secondary-air pipes 131 (e.g., the inner pipe). The diverging pipe 114 surrounds and defines the diverging chamber. Along the vertical direction, the swirl-flow pre-combustion chamber 112, the diverging chamber, and the combustion chamber 1111 are connected in sequence from top to bottom.

Figure 5:
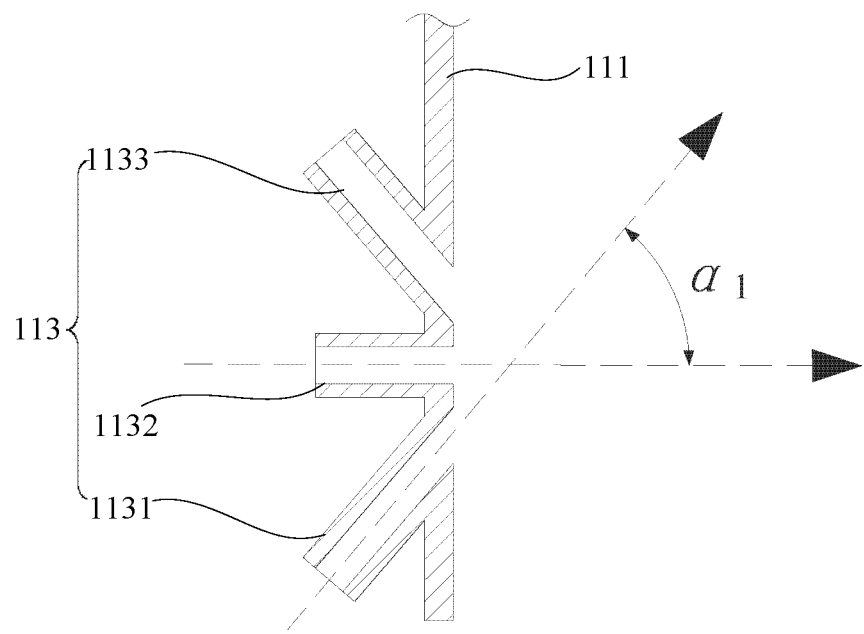
FIG. 5 is a schematic view showing an inclination angle of an acclivitous jetting pipe of the atmosphere-adjustable multi-staged swirl ammonia burner shown in FIG. 1.
Figure 6:
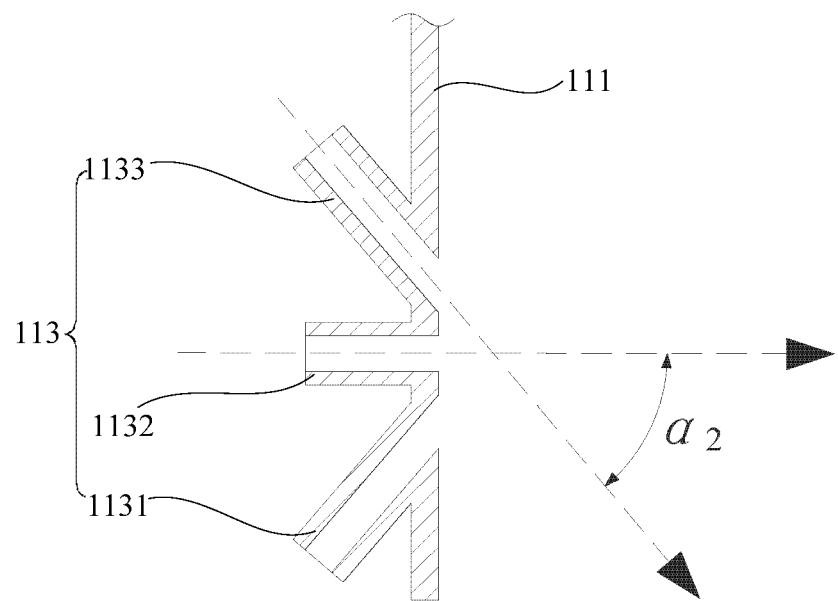
FIG. 6 is a schematic view showing an inclination angle of a declivous jetting pipe of the atmosphere-adjustable multi-staged swirl ammonia burner shown in FIG. 1.

Referring to FIG. 1, FIG. 5, and FIG. 6, in an embodiment, the staged-flow adjustment assembly 113 includes an acclivitous jetting pipe 1131, a horizontal jetting pipe 1132, and a declivous jetting pipe 1133. The horizontal jetting pipe 1132 is disposed on the combustion housing 111 and is fluid communicated with the combustion chamber 1111, and extends along the horizontal direction. The acclivitous jetting pipe 1131 is located below the horizontal jetting pipe 1132. One end of the acclivitous jetting pipe 1131 is disposed on the combustion housing 111 and is fluid communicated with the combustion chamber 1111, and the other end of the acclivitous jetting pipe 1131 extends away from the horizontal jetting pipe 1132. The declivous jetting pipe 1133 is located above the horizontal jetting pipe 1132. One end of the declivous jetting pipe 1133 is disposed on the combustion housing 111 and is fluid communicated with the combustion chamber 1111, and the other end of the declivous jetting pipe 1133 extends away from the horizontal jetting pipe 1132.

Referring to FIG. 1, FIG. 5 and FIG. 6, the staged-flow adjustment assembly 113 has three injecting pipes, specifically are the acclivitous jetting pipe 1131, the horizontal jetting pipe 1132, and the declivous jetting pipe 1133. The horizontal jetting pipe 1132 is disposed along the horizontal direction, and is fluid communicated with the combustion chamber 1111, and is configured to jet air along the horizontal direction into the combustion chamber 1111. The acclivitous jetting pipe 1131 is arranged below the horizontal jetting pipe 1132, and is configured to jet air along an upward slopping line into the combustion chamber 1111. There is an angle $\alpha 1$ between the acclivitous jetting pipe 1132 and the horizontal jetting pipe 1132. The declivous jetting pipe 1133 is arranged above the horizontal jetting pipe 1132, and is configured to jet air along a downward slopping line into the combustion chamber 1111. There is an angle $\alpha 2$ between the declivous jetting pipe 1132 and the horizontal jetting pipe 1132. The acclivitous jetting pipe 1131, the horizontal jetting pipe 1132, and the declivous jetting pipe 1133 are configured to jet air at different angles.

The above-described secondary-air structure 130 and the acclivitous jetting pipe 1131, horizontal jetting pipe 1132, and declivous jetting pipe 1133 of the above-described staged-flow adjustment assembly 113 are beneficial to construct multi-staged airflows or staged combustion of fuel and to reduce $NO_x$ generation during the combustion process. In addition, by adjusting the flow rate ratio between two adjacent airflows ejected from the staged-flow adjustment assembly 113, the injection angle of the staged airflows can be adjusted, thereby adjusting the position and time of supplement of the staged airflows to optimize the combustion.

During the operation of the multi-staged swirl ammonia burner 100 of the above embodiments, the air flow of the declivous jetting pipe 1133 can be turned off and the air flows of the acclivitous jetting pipe 1131 and the horizontal jetting pipe 1132 can be turned on at the same time. Due to the included angle between the acclivitous jetting pipe 1131 and the horizontal jetting pipe 1132, the two adjacent air flows will be mixed after being ejected for a certain distance to form an air jet. Based on Bernoulli's principle, by adjusting the flow rate ratio between the acclivitous jetting pipe 1131 and the horizontal jetting pipe 1132, the mutual ejection effect between two adjacent air flows can be changed, thereby changing the jet angle after the adjacent air flows are mixed, and thus flexibly adjusting the incident angle of the air jet between 0° and α1.

In addition, in order to realize the flexible adjustment of the incident angle of the air jet between 0° and −α2, the air flow of the acclivitous jetting pipe 1131 can be turned off and the air flows of the declivous jetting pipe 1133 and the horizontal jetting pipe 1132 can be turned on at the same time. There is the included angle between the declivous jetting pipe 1133 and horizontal jetting pipe 1132, and thus the two adjacent air flows will be mixed after being ejected for a certain distance to form an air jet. Based on Bernoulli's principle, by adjusting the flow rate ratio between the declivous jetting pipe 1133 and the horizontal jetting pipe 1132, the mutual ejection effect between two adjacent air flows can be changed, thereby changing the jet angle after the adjacent air flows are mixed, and thus flexibly adjusting the incident angle of the air jet between 0° and −α2.

In an embodiment, the number of the staged-flow adjustment assemblies 113 is plural, and the plurality of staged-flow adjustment assemblies 113 are evenly distributed on the outer peripheral surface of the combustion housing 111.

In an embodiment, the staged-flow adjustment assembly 113 further includes a first valve, a second valve, and a third valve. The first valve is disposed in the acclivitous jetting pipe 1131 to control the on and off of the air flow of the acclivitous jetting pipe 1131. The second valve is disposed in the horizontal jetting pipe 1132 to control the on and off of the air flow of the horizontal jetting pipe 1132. The third valve is disposed in the declivous jetting pipe 1133 to control the on and off of the air flow of the declivous jetting pipe 1133.

The on-off control of the acclivitous jetting pipe 1131 is realized through the first valve, the on-off control of the horizontal jetting pipe 1132 is realized through the second valve, and the on-off control of the declivous jetting pipe 1133 is realized through the third valve, so that the desired direction of the staged airflows can be decided, thereby flexibly adjusting the incident angle of the airflow. The first valve, second valve and third valve can be conventional valve structures.

Referring to FIG. 1 and FIG. 12, during the operating process of the multi-staged swirl ammonia burner 100 of the present application, ammonia gas first flows into the burner 100 through the branched inlet pipe 141, and enters the air flow channel inside the adjustment pipe 1422 through the flow-adjustment hole 14221 located on the adjustment pipe 1422. Then the ammonia gas flows into the ejecting head 1423 connected to the lower end of the central pipe 1421, and is finally ejected at a high speed from the plurality of ejecting holes 14231 located on the side wall and the bottom wall of the ejecting head 1423. Meanwhile, fuel gas is sprayed into the swirl-flow pre-combustion chamber 112 through the plurality of inner tangential channels 123 uniformly distributed in the tangential inflow structure 120, and part of the air is sprayed into the swirl-flow pre-combustion chamber 112 through the plurality of outer tangential channels 122 uniformly distributed in the tangential inflow structure 120. Since the inner tangential channels 123 and outer tangential channels 122 are adjacent to each other and are arranged in tangential directions, the fuel gas and the part of the air can be rapidly mixed and swirled at a high speed in the swirl-flow pre-combustion chamber 112, forming a low-pressure zone inside the high-speed swirling flow, which is beneficial to the formation of the first-stage high-temperature fluid recirculation zone to promote rapid pre-heating, pyrolysis and ignition of the ammonia ejected from the ejecting head 1423, and to suppress the generation of $NO_x$.

At the same time, the secondary air (i.e., a certain amount of air) flows into the burner 100 from the radial channel of the secondary-air pipe 131, and is guided by the axial vanes 132 located inside the axial channel to generate a high-speed swirling flow when flowing through the axial channel. Then the high-speed swirling flow sequentially flows into the diverging chamber and the combustion chamber 1111 to supplement the required amount of oxygen for the combustion of ammonia. Since the low-pressure zone is formed in the central area of the high-speed swirling flow, the second-stage high-temperature fluid recirculation zone is formed, which further promotes the stable combustion of ammonia while creates a high-temperature reducing atmosphere to suppress the generation of $NO_x$. Meanwhile, the staged airflows are injected into the combustion chamber 1111 from the plurality of staged-flow adjustment assemblies 113 at the lower end of the combustion chamber 1111, and further mix and combust with the high-temperature flame from the upstream, thereby forming staged air flows to reduce NO generation. In addition, a part of the ammonia gas can also be introduced through the staged-flow adjustment assemblies 113 to achieve fuel staged combustion of ammonia gas, thereby promoting stable combustion and reducing NO generation.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present application.

The above-described embodiments are only several implementations of the present application, and the descriptions are relatively specific and detailed, but they should not be construed as limiting the scope of the present application. It should be understood by those of ordinary skill in the art that various modifications and improvements can be made without departing from the concept of the present application, and all fall within the protection scope of the present application. Therefore, the patent protection of the present application shall be defined by the appended claims.

What is claimed is:

1. An atmosphere-adjustable multi-staged swirl ammonia burner, comprising:
a combustion structure comprising a swirl-flow pre-combustion chamber, a combustion housing, and a staged-flow adjustment assembly which are sequentially arranged, the combustion housing defining a combustion chamber, the swirl-flow pre-combustion chamber being in fluid communication with the combustion chamber, and the staged-flow adjustment assembly being disposed on a side wall of the combustion housing and away from the swirl-flow pre-combustion chamber, the staged-flow adjustment assembly being in fluid communication with the combustion chamber and configured to introduce staged airflows into the combustion chamber;
a tangential inflow structure disposed on a top of the swirl-flow pre-combustion chamber, fluid communicated with the swirl-flow pre-combustion chamber, and configured to introduce air and fuel gas into the swirl-flow pre-combustion chamber;
a secondary-air structure disposed between the combustion housing and the tangential inflow structure, the secondary-air structure and the tangential inflow structure surrounding the swirl-flow pre-combustion chamber, and the secondary-air structure being in fluid communication with the combustion chamber and configured to introduce secondary air into the combustion chamber; and an ammonia adjustment structure extending through the tangential inflow structure into the combustion chamber, the ammonia adjustment structure comprising a branched inlet pipe and a central adjustment assembly, one end of the central adjustment assembly extending through the tangential inflow structure into the combustion structure, one end of the branched inlet pipe being in fluid communication with the central adjustment assembly and the combustion chamber, the branched inlet pipe being configured to introduce ammonia gas, and the central adjustment assembly being configured to adjust spray shape of the ammonia gas introduced from the branched inlet pipe.

2. The atmosphere-adjustable multi-staged swirl ammonia burner of claim 1, wherein the central adjustment assembly comprises a central pipe and an adjustment pipe; the central pipe is a hollow member, and one end of the central pipe passes through the tangential inflow structure and is in fluid communication with the combustion chamber; the adjustment pipe defines a flow-adjustment hole extending along an axial direction of the adjustment pipe, the branched inlet pipe is connected to the central pipe and is in fluid communication with the central pipe through the adjustment pipe, and the adjustment pipe is movably arranged in the central pipe and is configured to adjust a fluid communication area between the flow-adjustment hole and the branched inlet pipe.

3. The atmosphere-adjustable multi-staged swirl ammonia burner of claim 2, wherein a projection of the flow-adjustment hole in the axial direction of the adjustment pipe is rectangular; an axial dimension of the flow-adjustment hole is greater than a diameter of the branched inlet pipe.

4. The atmosphere-adjustable multi-staged swirl ammonia burner of claim 2, wherein the central adjustment assembly comprises an ejecting head which is a hollow member, and the ejecting head is mounted to an end of the central pipe located in the combustion chamber; the ejecting head defines a plurality of ejecting holes, and the plurality of ejecting holes are distributed in rows spaced from each other, and a lowermost ejecting hole is located at the bottom of the ejecting head and coincides with an axis of the central pipe, the ejecting holes are configured to inject ammonia gas into the combustion chamber;

an extending angle between an extending direction of each ejecting hole and a horizontal direction is greater than or equal to 0° and less than or equal to 90°, along the axial direction of the central pipe from bottom to top, the extending angle of the ejecting holes gradually decreases from 90° to 0°.

5. The atmosphere-adjustable multi-staged swirl ammonia burner of claim 4, wherein the number of rows of the ejecting holes is five, the extending angle between the extending directions of the ejecting holes of a first row and the horizontal direction is 0° to 5°, the extending angle between the extending directions of the ejecting holes of a second row and the horizontal direction is 25° to 35°, the extending angle between the extending directions of the ejecting holes of a third row and the horizontal direction is 55° to 65°, the extending angle between the extending directions of the ejecting holes of a fourth row and the horizontal direction is 70° to 80°, the ejecting hole of a fifth row is arranged at the bottom of the ejecting head and extends along a vertical direction.

6. The atmosphere-adjustable multi-staged swirl ammonia burner of claim 1, wherein the secondary-air structure comprises:

two coaxially arranged secondary-air pipes defining a secondary-air channel therebetween; and a plurality of axial vanes disposed in the secondary-air channel, wherein the coaxially arranged secondary-air pipes are connected between the combustion housing and the tangential inflow structure;

the coaxially arranged secondary-air pipes comprises a first pipe and a second pipe; the first pipe is sleeved outside the second pipe, the first pipe is connected to the combustion housing, and the second pipe is connected to the tangential inflow structure.

7. The atmosphere-adjustable multi-staged swirl ammonia burner of claim 6, wherein the secondary-air channel comprises a radial channel extending in a radial direction and an axial channel extending in an axial direction and fluid communicating with the radial channel; one end of the radial channel is in fluid communication with an external environment, and the other end of the radial channel is in fluid communication with one end of the axial channel; the other end of the axial channel is in fluid communication with the combustion chamber, the plurality of axial vanes are arranged in the axial channel.

8. The atmosphere-adjustable multi-staged swirl ammonia burner of claim 6, wherein the tangential inflow structure comprises a tangential structure, and the tangential structure is arranged on a top of the secondary-air pipes and cooperatively defines the swirl-flow pre-combustion chamber with an inner wall of the second pipe;

an inner tangential channel and an outer tangential channel are defined in the tangential structure, the inner tangential channel and the outer tangential channel are both in fluid communication with the swirl-flow pre-combustion chamber; the outer tangential channel is configured for conveying air, and the inner tangential channel is configured for conveying fuel gas; the inner tangential channel and the outer tangential channel are parallel to and spaced from each other.

9. The atmosphere-adjustable multi-staged swirl ammonia burner of claim 7, wherein the outer tangential channel coincides with a tangent to circular inner wall of the tangential structure, and the inner tangential channel is located at a clockwise side of the outer tangential channel.

10. The atmosphere-adjustable multi-staged swirl ammonia burner of claim 7, wherein the inner tangential channel and the outer tangential channel constitute a pair of channels, and a plurality of pairs of channels are defined in the tangential structure, and the plurality of pairs of channels are disposed along an outer peripheral surface of the tangential structure and spaced from each other.

11. The atmosphere-adjustable multi-staged swirl ammonia burner of claim 6, wherein the combustion structure further comprises a diverging pipe, and the diverging pipe is disposed between the combustion housing and the secondary-air pipe; in the direction from the pre-combustion chamber to the combustion housing, the diameter of the diverging pipe gradually increases to form a diverging chamber, and the diverging chamber is in fluid communication with the swirl-flow pre-combustion chamber and the combustion chamber.

12. The atmosphere-adjustable multi-staged swirl ammonia burner of claim 1, wherein the staged-flow adjustment assembly comprises an acclivitous jetting pipe, a horizontal jetting pipe, a declivous jetting pipe all communicated with the combustion chamber;

the horizontal jetting pipe is disposed on the combustion housing and extends along the horizontal direction;

the acclivitous jetting pipe is located below the horizontal jetting pipe, one end of the acclivitous jetting pipe is disposed on the combustion housing, and another end of the acclivitous jetting pipe extends away from the horizontal jetting pipe;

the declivous jetting pipe is located above the horizontal jetting pipe, one end of the declivous jetting pipe is disposed on the combustion housing, and another end of the declivous jetting pipe extends away from the horizontal jetting pipe.

13. The atmosphere-adjustable multi-staged swirl ammonia burner of claim 12, wherein the staged-flow adjustment assembly further comprises a first valve, a second valve, and a third valve; the first valve is disposed in the acclivitous jetting pipe and is configured to control on and off of air flow of the acclivitous jetting pipe; the second valve is disposed in the horizontal jetting pipe and is configured to control on and off of air flow of the horizontal jetting pipe; and the third valve is disposed in the declivous jetting pipe and is configured to control on and off of air flow of the declivous jetting pipe.

14. The atmosphere-adjustable multi-staged swirl ammonia burner of claim 12, wherein the number of the staged-flow adjustment assemblies is plural, and the plurality of staged-flow adjustment assemblies are evenly distributed on an outer peripheral surface of the combustion housing.

* * * * *